United States Patent
Terunuma et al.

(10) Patent No.: US 7,965,056 B2
(45) Date of Patent: Jun. 21, 2011

(54) CONTROL APPARATUS OF POWER CONVERSION SYSTEM

(75) Inventors: Mutsuhiro Terunuma, Mito (JP); Eiichi Toyota, Hitachinaka (JP); Motomi Shimada, Mito (JP); Masahiro Nagasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 578 days.

(21) Appl. No.: 12/108,573

(22) Filed: Apr. 24, 2008

(65) Prior Publication Data

US 2008/0266920 A1 Oct. 30, 2008

(30) Foreign Application Priority Data

Apr. 27, 2007 (JP) ................. 2007-118390

(51) Int. Cl.
*H02P 27/04* (2006.01)
(52) U.S. Cl. .............. 318/800; 318/801; 363/124
(58) Field of Classification Search .............. 318/727, 318/800, 801, 805, 812; 363/124, 131
See application file for complete search history.

(56) References Cited

U.S. PATENT DOCUMENTS

| | | | | |
|---|---|---|---|---|
| 4,825,131 A | * | 4/1989 | Nozaki et al. .............. | 318/52 |
| 5,521,788 A | * | 5/1996 | Miyazaki .............. | 361/42 |
| 5,977,742 A | * | 11/1999 | Henmi .............. | 318/801 |
| 2006/0290318 A1 | * | 12/2006 | Toda et al. .............. | 318/801 |
| 2007/0002995 A1 | * | 1/2007 | Hemmi et al. .............. | 375/377 |

FOREIGN PATENT DOCUMENTS

| JP | 2001-054210 | 2/2001 |
|---|---|---|
| JP | 2002-369304 | 12/2002 |

OTHER PUBLICATIONS

Yoshiaki Taguchi et al., A Simple Construction of Series-Input Energy Storage Device Connected with Inverter, The Papers of Technical Meeting on Transportation and Electric Railway, IEE Japan, Sep. 8, 2006, pp. 27-32.

* cited by examiner

*Primary Examiner* — Rina I Duda
(74) *Attorney, Agent, or Firm* — Antonelli, Terry, Stout & Kraus, LLP.

(57) ABSTRACT

The invention provides a control apparatus of a power conversion system for driving an induction motor via a VVVF inverter, wherein the AC voltage generated by the inverter is increased so as to expand the high-speed side property of the induction motor, to thereby improve the performance during power running and regenerative braking. In the present system, a DC power supply source having a power storage system with a capacity capable of processing the current flowing into or out of the inverter is inserted in series to the ground side of the input of the inverter, and the output voltage thereof is controlled from zero in a continuous manner to be added to the trolley voltage, which is then applied to the inverter.

11 Claims, 9 Drawing Sheets

CONTROL APPARATUS OF POWER CONVERSION SYSTEM

The present application is based on and claims priority of Japanese patent application No. 2007-118390 filed on Apr. 27, 2007, the entire contents of which are hereby incorporated by reference.

BACKGROUND OF THE INVENTION

1. Field of the Invention

The present invention relates to an apparatus for controlling a power conversion system for driving an induction motor via a VVVF inverter, and more specifically, relates to a control apparatus of a power conversion system having a DC voltage generating means with a power storage system disposed on the DC power supply side and driving the motor using the power generated by the DC voltage generating means.

2. Description of the Related Art

In so-called inverter railway vehicles in which induction motors are driven via VVVF (variable-voltage variable-frequency) inverter control, all-electric brakes have been put into practical use in which the railway vehicles are stopped by applying only the braking force of electric power and not by using air brakes just before stopping.

It is advantageous to obtain stopping force only via electric power without depending on air brakes, since it not only suppresses abrasion of the brake shoe, which leads to improvement of vehicle maintenance, but also causes no delay of the air brake, which contributes to the enhancement of stopping accuracy.

As described, since there are a number of advantages in stopping the railway vehicle using only electric brakes instead of the conventionally-used air brake, it is possible to obtain great advantages with respect to the abrasion of the brake shoe if it becomes possible to replace the air brake with the electric brake throughout the whole speed region of the railway vehicle.

However, in inverter control, the maximum AC-side output voltage of the induction motor is determined by the DC-side input, that is, the input voltage of the inverter, and since the induction motor of the railway vehicle utilizes the AC output voltage in the high speed region, there is a drawback in that the required brake force cannot be obtained by applying the electric brake only.

Therefore, attempts have been made to increase the brake force by raising the voltage of the induction motor while applying the brake, for example, by inserting an impedance such as a resist or a capacitor. However, such arrangement has drawbacks in that the regenerative energy during braking is consumed fruitlessly and that the voltage has no continuity. For example, Japanese patent application laid-open publication No. 2002-369304 discloses a system that does not waste regenerative energy, but the voltage thereof has no continuity.

SUMMARY OF THE INVENTION

In view of the above drawbacks, the present invention aims at providing a drive control apparatus of a railway vehicle capable of obtaining the necessary electric brake force by maintaining continuity of voltage without wasting regenerative energy.

The above object of the present invention can be achieved by inserting a DC power supply source including a power storage system having a capacity capable of processing the current flowing into or out of the inverter in series to the ground side of the input of the inverter, so as to continuously control the generated output voltage from zero.

The effects of the present invention are as follows.

According to the present invention, the property of the induction motor can be expanded toward the high-speed side, by which the electric brake range can be expanded and the abrasion of the brake shoe can be cut down. Further, since the increase of brake force leads to the increase of regenerative electric power, the regeneration rate of electric power is improved, realizing energy conservation as a result. Furthermore, since the property of power running is also expanded toward the high-speed side, the improvement of control performance can be expected. The insertion of a DC power supply source to the ground side of the inverter realizes a further advantage of not having to use high-pressure components corresponding to the trolley voltage as components for the power supply source.

DETAILED DESCRIPTION OF THE PREFERRED EMBODIMENTS

Now, the preferred embodiments of the present invention will be described with reference to the drawings.

Embodiment 1

Figure 1:
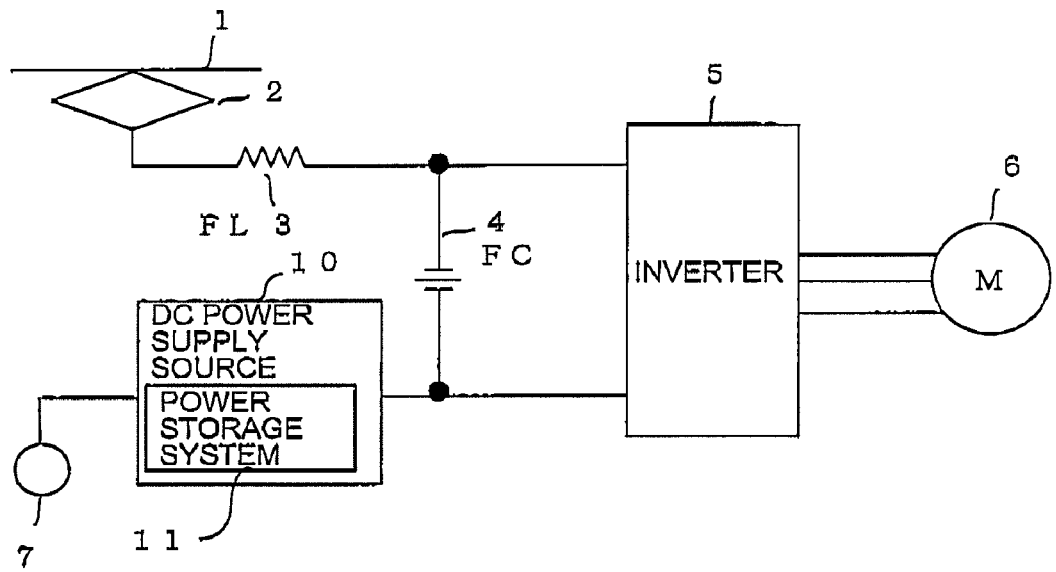
FIG. 1 is an explanatory view of a control apparatus of a power converter according to embodiment 1 of the present invention.

FIG. 1 shows a control apparatus of a power converter according to a first embodiment of the present invention. In FIG. 1, DC power from an overhead wire 1 is collected via a pantograph 2, which is supplied via a filter reactor FL3 and a filter capacitor FC4 to an inverter 5. The DC power is converted in the inverter 5 into AC power for activating an induction motor 6. A DC power supply source 10 including a power storage system 11 is inserted to the ground-side of the inverter 5 for generating DC voltage. The current is returned to the railway track via wheels 7. The above-described operation refers to the case where the railway vehicle is running by power, and when the brake is applied, the induction motor 6 functions as a power generator, regenerating the power toward the overhead wire 1. Therefore, the current flowing in the inverter 5 is supplied to the DC power supply source 10, so that both the current flowing into the inverter and the current flowing out of the inverter are controlled.

Figure 2:
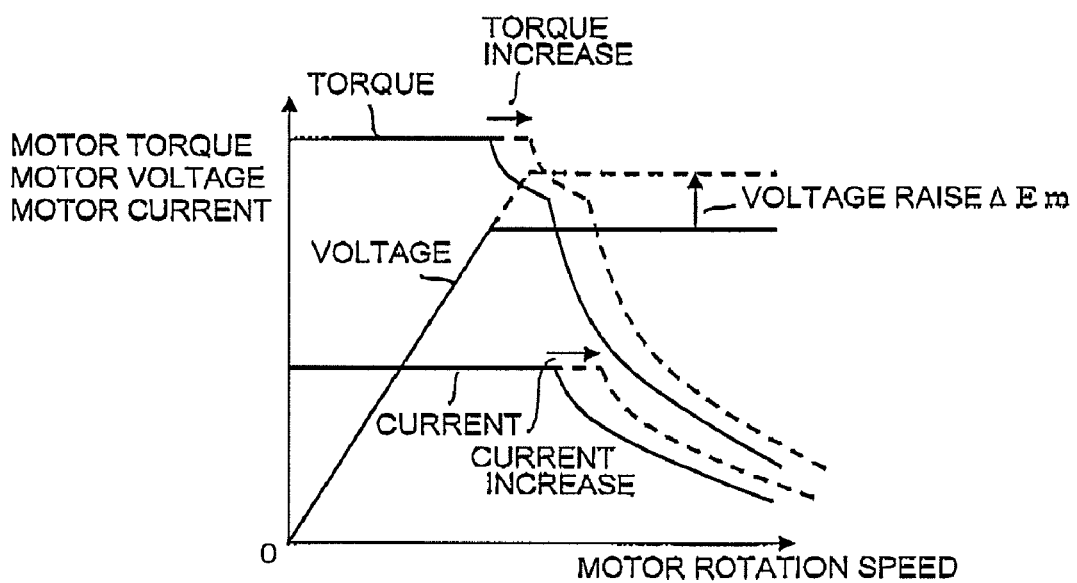
FIG. 2 is an explanatory view illustrating the property of an induction motor during power running of the power converter.
Figure 3:
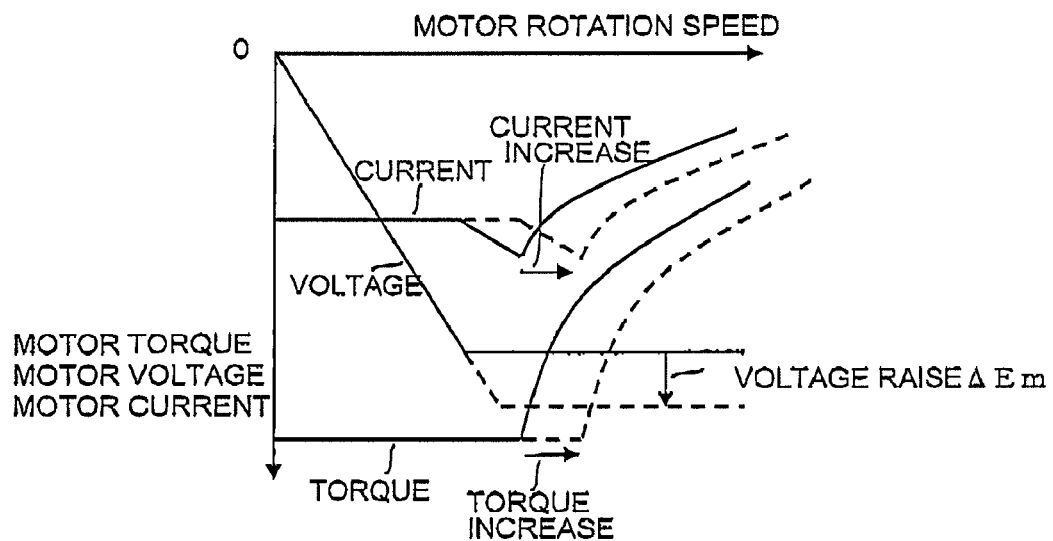
FIG. 3 is an explanatory view illustrating the property of an induction motor during braking of the power converter.
Figure 4:
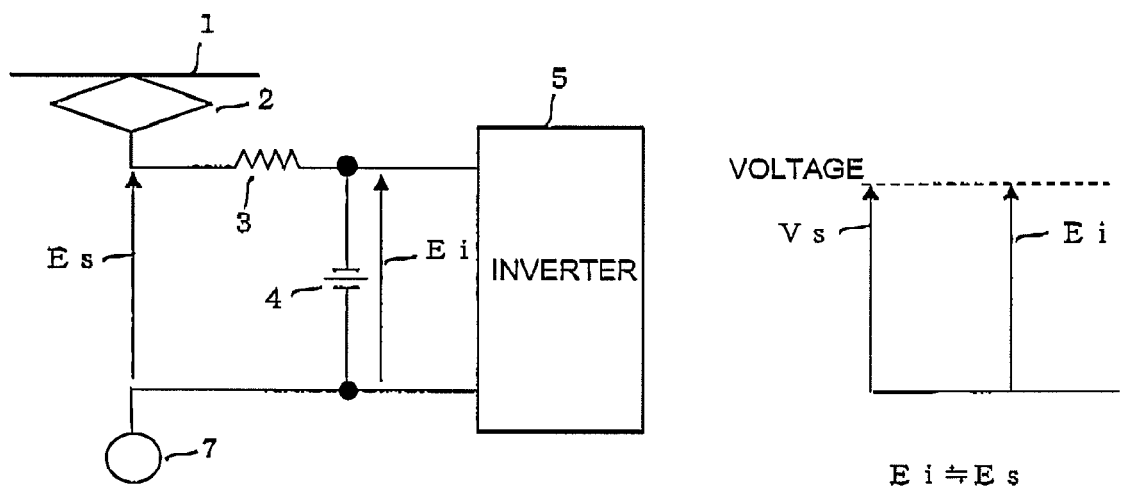
FIG. 4 is an explanatory view illustrating the relationship between the trolley voltage and the inverter input voltage of the power converter.
Figure 5:
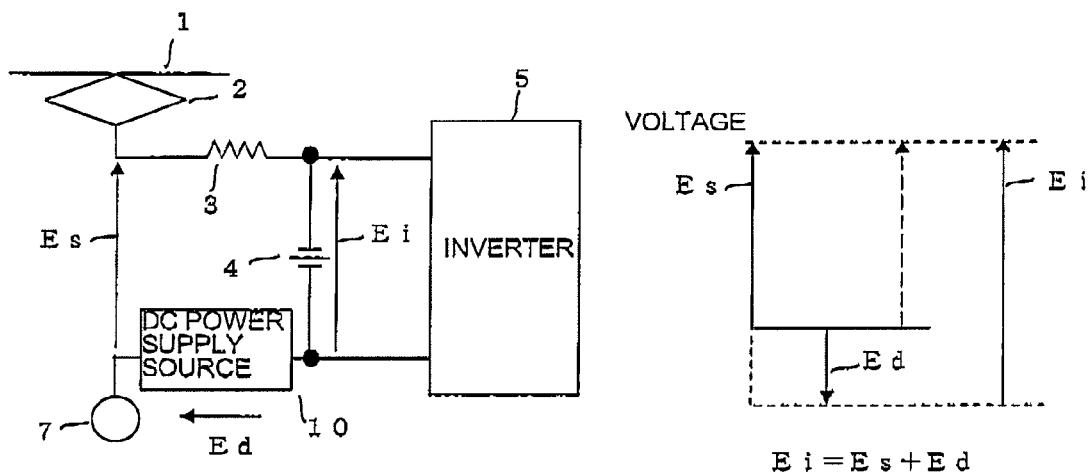
FIG. 5 is an explanatory view illustrating the relationship of the trolley voltage, the DC power supply source voltage and the inverter input voltage of the power converter according to embodiment 1 of the present invention.

The general properties of an induction motor of a railway vehicle are illustrated in FIGS. 2 and 3. FIG. 2 shows the properties during power running, and FIG. 3 shows the properties during braking. The property chart of FIG. 3 is illustrated upside-down so as enable comparison with the properties during power running. In a normal power converter where no DC power supply source 10 is inserted, as shown in FIG. 4, the trolley voltage Es is approximately equal to the inverter input voltage Ei, which is the properties shown by the solid lines of FIGS. 2 and 3.

According to embodiment 1 of the present invention, the DC power supply source 10 is inserted to the input side of the inverter so as to control the output voltage Ed of the DC power supply source 10 to be added to the trolley voltage Es, by which the inverter input voltage Ei equals Es+Ed. As shown in the properties indicated by the dotted lines of FIGS. 2 and 3, along with the raise of input voltage to the inverter, the AC voltage generated by the induction motor 6 is expanded for ΔEm, and as a result, the properties of current and torque are expanded toward the high-speed side. Accordingly, when the DC voltage is increased, the power processed by the inverter is also expanded, enabling a greater regenerative electric power than normal to be obtained during braking.

Figure 6:
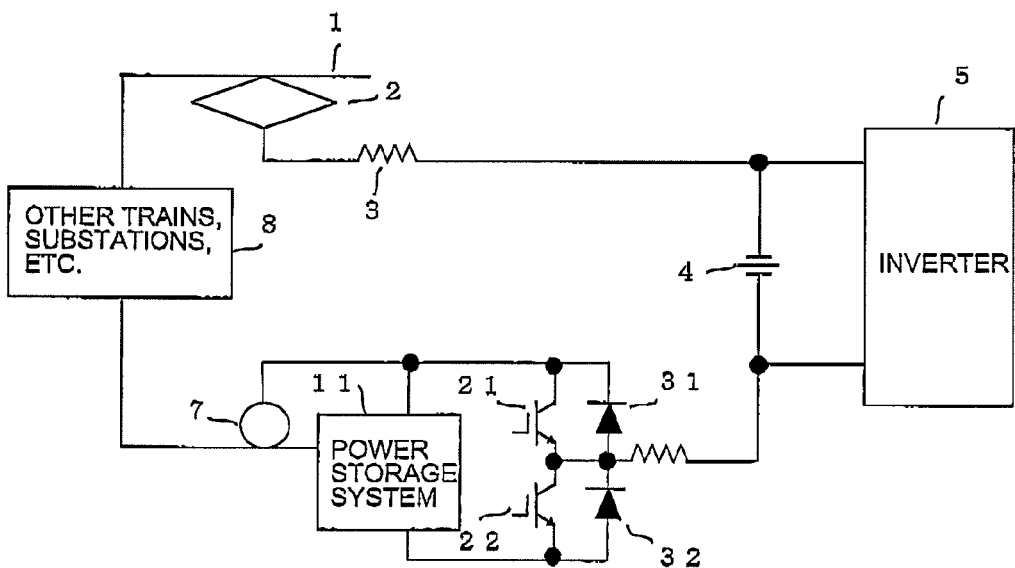
FIG. 6 is an explanatory view of the power converter having inserted the DC generating power supply unit according to embodiment 1 of the present invention.

In railway vehicles, it is preferable for the output voltage of the DC power supply source 10 to be controlled continuously starting from zero. FIG. 6 illustrates an actual example using a voltage source for outputting such DC voltage.

In FIG. 6, descriptions of the portions that are common to the system illustrated in FIG. 1 are omitted. Although not shown in FIG. 1, other railway vehicles and substations that absorb the regenerative energy exist between the overhead wire 1 and the wheels 7, which are denoted by reference number 8.

A power storage system 11 is an energy storage system capable of storing and discharging power, wherein a switching element 21 is connected to a positive terminal and a switching element 22 is connected to a negative terminal thereof, and the switching elements 21 and 22 are connected in series. Flywheel diodes 31 and 32 are connected in parallel to the switching elements 21 and 22, respectively. The midpoint of switching elements 21 and 22 is connected to the midpoint of flywheel diodes 31 and 32, which is further connected via a reactor 41 to the ground side of the inverter 5. The positive terminal side of the power storage system 11 is connected to the wheel 7.

At this time, by constantly setting one of the switching elements to be off while turning the other switching element on and off in a chopping action, chopping voltage occurs at the midpoint between the switching element and the diode. DC voltage can be obtained by smoothing the chopping voltage, wherein the DC voltage is added to the trolley voltage and applied to the inverter 5. The DC voltage can be varied continuously from zero by controlling the chopping cycle (conduction ratio) of the switching element.

Figure 7:
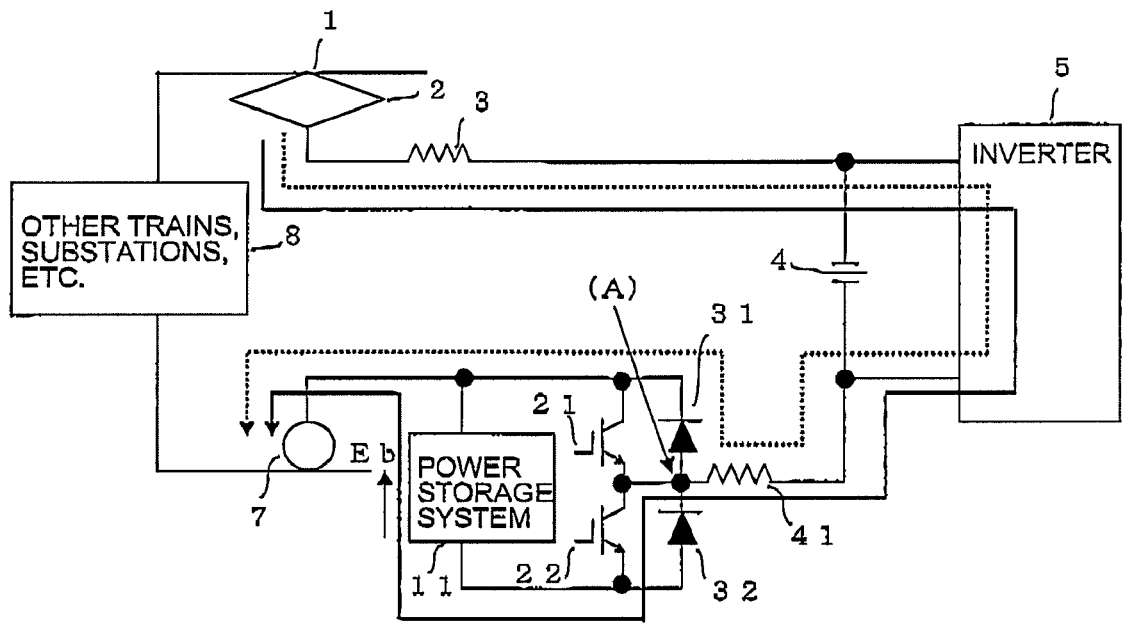
FIG. 7 is an explanatory view of the operation during power running of the power converter according to embodiment 1 of the present invention illustrated in FIG. 6.

Now, the operation of FIG. 6 will be described in detail hereafter. FIG. 7 shows the operation status during power running. In FIG. 7, when the switching element 21 is continuously turned off and the switching element 22 is turned on, current is flown through a path passing through the reactor 41, the switching element 22 and the power storage system 11 as shown by the solid line, and voltage (−)Eb of the power storage system 11 is output as shown by the solid line of FIG. 8.

Figure 8:
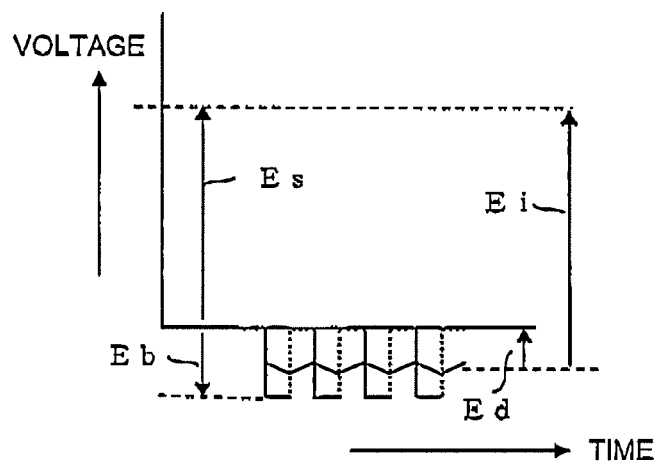
FIG. 8 is an explanatory view of the generated voltage of the power converter of FIG. 7.

When the switching element 22 is turned off while the switching element 21 is at an off state, current flows as shown by the dotted line through the reactor 41 and the flywheel diode 31, and the potential at point (A) becomes zero, as shown by the dotted line of FIG. 8. As described, a chopping voltage of voltage Eb of the power storage system 11 is generated by turning the switching element 22 on and off. Voltage Ed generated by smoothing the chopping voltage via the reactor 41 and the filter capacitor 4 is added to the trolley voltage Es, and becomes an input voltage Ei of the inverter 5. The amplitude of the generated voltage Ed can be varied continuously by controlling the conduction ratio of chopping of the switching element 22. Thus, it becomes possible to change the amplitude of the generated voltage or to insert or remove the voltage at arbitrary timings.

Figure 9:
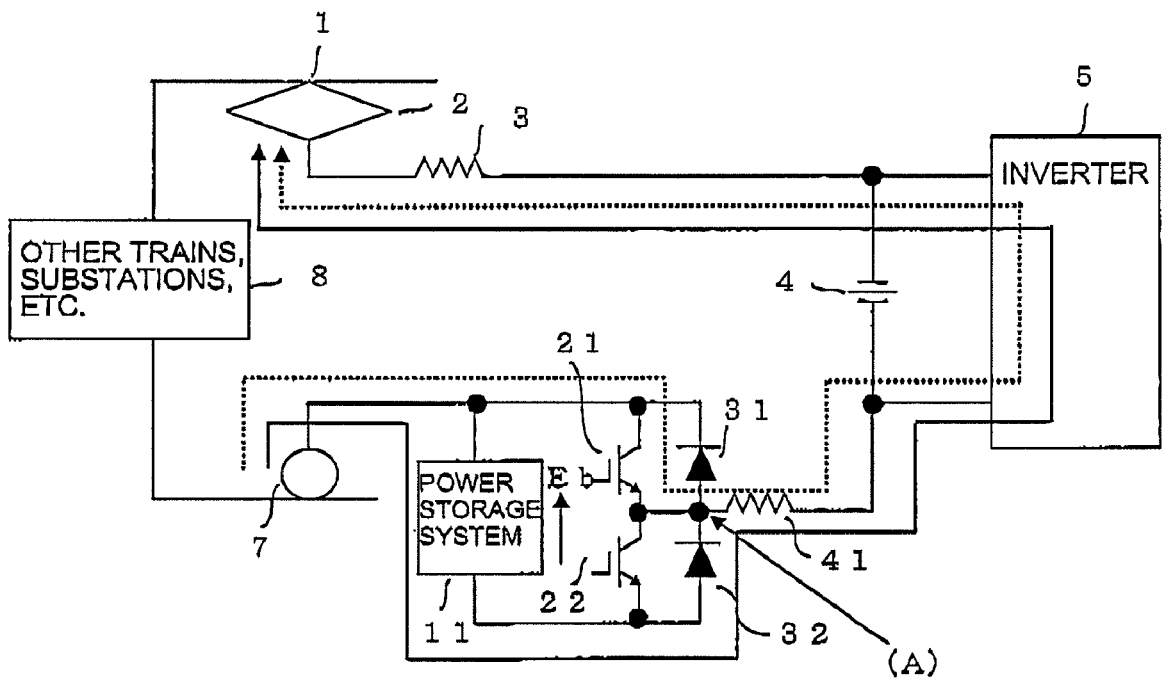
FIG. 9 is an explanatory view of the operation during regenerative braking of the power converter according to embodiment 1 of the present invention shown in FIG. 6.

FIG. 9 illustrates the operation status during braking. When the brake is applied, the switching element 22 is constantly turned off. At this time, by turning the switching element 21 off, current flows from the power storage system 11 via the flywheel diode 32 and the reactor 41 through a path shown by the solid line, and voltage (−)Eb appears at point (A) as shown by the solid line of FIG. 10.

Figure 10:
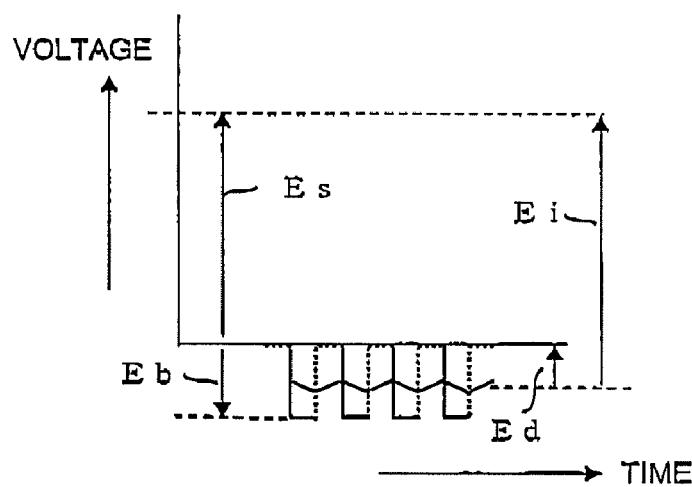
FIG. 10 is an explanatory view of the generated voltage of the power converter shown in FIG. 9.

Next, when the switching element 21 is turned on, current flows via the switching element 21 and the reactor 41 through a path shown by the dotted line, and the potential of point (A) becomes zero, as shown by the dotted line of FIG. 10. As described, when the brake is operated, chopping voltage can be generated as shown in FIG. 10 by turning the switching element 21 on and off.

Similar to the operation during power running, this voltage is also smoothed via the reactor 41 and the filter capacitor 4 and becomes voltage Ed, which is applied to the generation voltage of the inverter 5, by which the regenerative electric power provided to the overhead wire is increased than usual, providing a greater electric brake force. Further, the reactor 41 can be connected either to the inverter 5 or the wheel 7 to obtain the same effect.

Now, the relationship between the voltage Ed generated by the DC power supply source and the inflowing/outflowing current of the inverter 5 is obtained. When the output voltage of the power storage system 11 is represented by Eb, the current of the power storage system 11 is represented by Ib, the DC current of the inverter 5 is represented by Ii and the chopping conduction ratio of switching elements 21 and 22 is represented by γ, then the following expressions are provided.

[Expression 2]

$$Ed = \gamma \times Eb \quad (2)$$

[Expression 3]

$$Ib = \gamma \times Ii \quad (3)$$

Based on expressions (2) and (3), the following expression is provided.

[Expression 4]

$$Ed \times Ii = Ib \times Eb \quad (4)$$

By controlling the chopping conduction ratio γ, the voltage Ed added to the inverter and the current Ib of the power storage system are selected.

Since in general, the conduction ratio γ is equal to or smaller than 1, the added voltage Ed is equal to or smaller than the voltage Eb of the power storage system 11, and is restricted by the following.

[Expression 5]

$$Ed \times Ii \leq \{Ib \times Eb(\text{maximum allowable value})\} \quad (5)$$

As for the capacity of the power storage system 11, the capacity should be equal to or smaller than the ratio loaded on the power storage system with respect to the energy within the speed range expanding the properties thereof.

Figure 16:
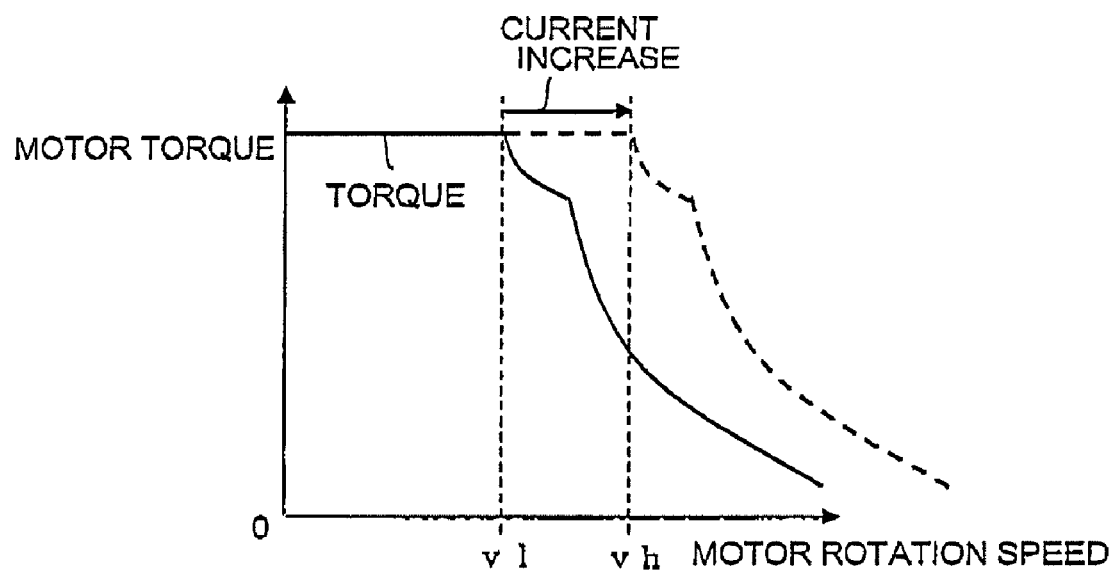
FIG. 16 is an explanatory view showing the selection of capacity of the power storage system according to embodiment 2 of the present invention.

As shown in FIG. 16, the speed to be expanded is referred to as vh, and the speed not requiring the addition of voltage by the power storage system is referred to as vl. When the weight of the railway car is M, the energy By between vh and vl can be expressed as follows.

[Expression 6]

$$Bv = \frac{1}{2}(vh^2 - vl^2) \times M \quad (6)$$

When considering the case where the conduction ratio is approximately equal to 1, the maximum value of voltage loaded on the power storage system can be the battery voltage Eb, so the maximum value Bbmax of the capacity of the power storage system can be substantially expressed by the following expression.

[Expression 7]

$$Bbmax \approx \frac{1}{2}(vh^2 - vl^2) \times M \times \frac{Eb}{(Es + Eb)} \quad (7)$$

Therefore, the power storage system should have a capacity equal to or smaller than Bbmax.

According to another characteristic of the present embodiment, the power storage system 11 is connected to both ends of the switching elements 21 and 22 and both ends of the flywheel diodes 31 and 32, so that the withstand pressure thereof should correspond to the power storage system and not to the applied voltage to the inverter. It the DC power supply source is inserted to the positive terminal side of the inverter, the element used in the DC power supply source must have a withstand pressure equivalent to that of the inverter. According to the present embodiment, however, the withstand pressure of the element should merely correspond to the additional voltage, so that it becomes possible to standardize or scale-down the device.

Embodiment 2

Figure 11:
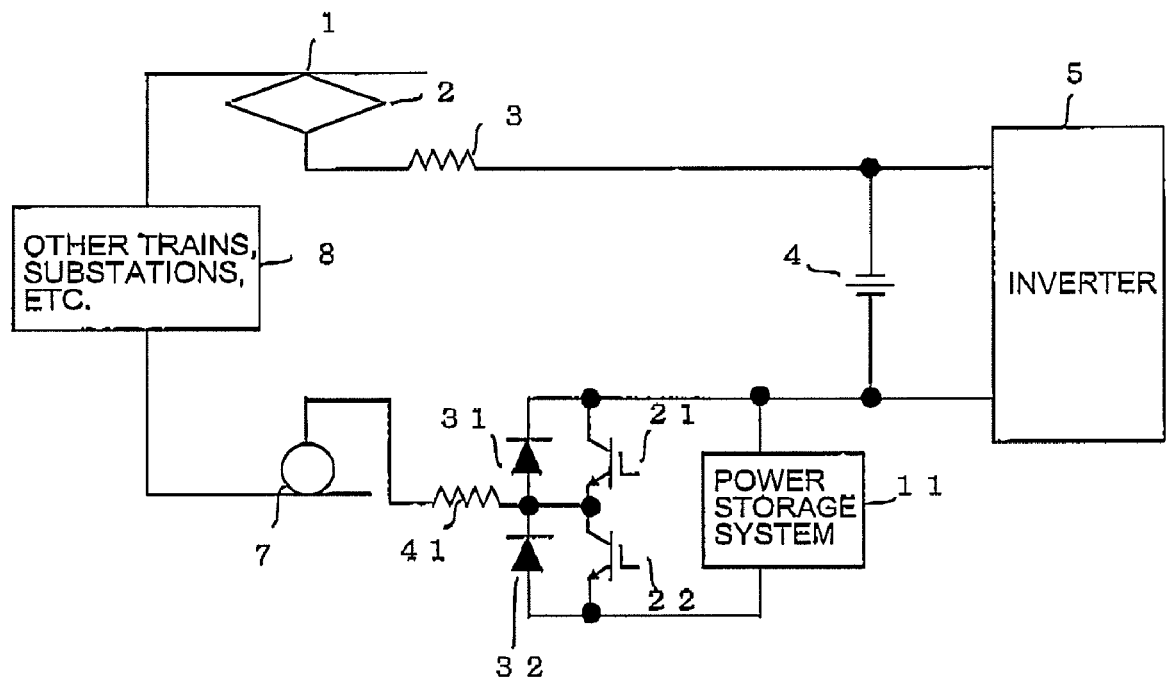
FIG. 11 is an explanatory view of the power converter having inserted the DC generating power supply unit according to embodiment 2 of the present invention.

Another embodiment of the present invention will now be described. FIG. 11 illustrates an example in which another power supply source capable of outputting CD power is used. The arrangement of the DC power supply source of FIG. 11 is substantially the same as that of FIG. 6, but with the following differences that the positive terminal side of the power storage system 11 is connected to the ground side of the inverter, and the output end of the reactor 41 from the midpoint of the switching elements 21 and 22 and the flywheel diodes 31 and 32 is connected to the wheel 7.

Figure 12:
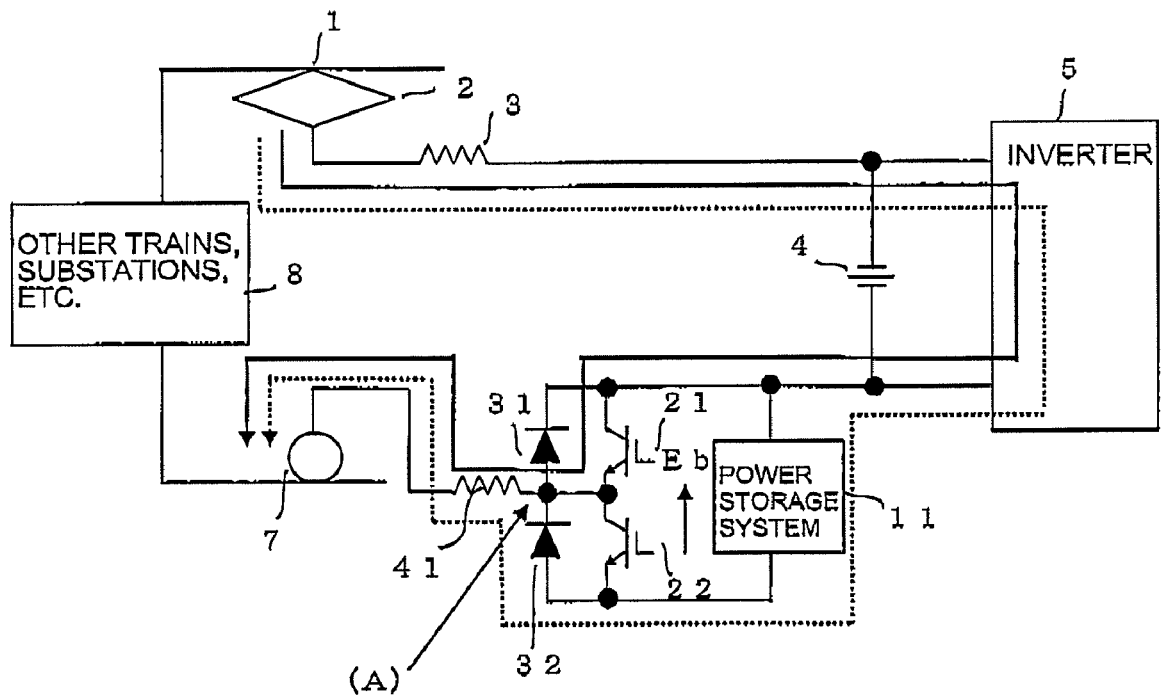
FIG. 12 is an explanatory view of the operation during power running of the power converter according to embodiment 2 of the present invention shown in FIG. 11.
Figure 13:
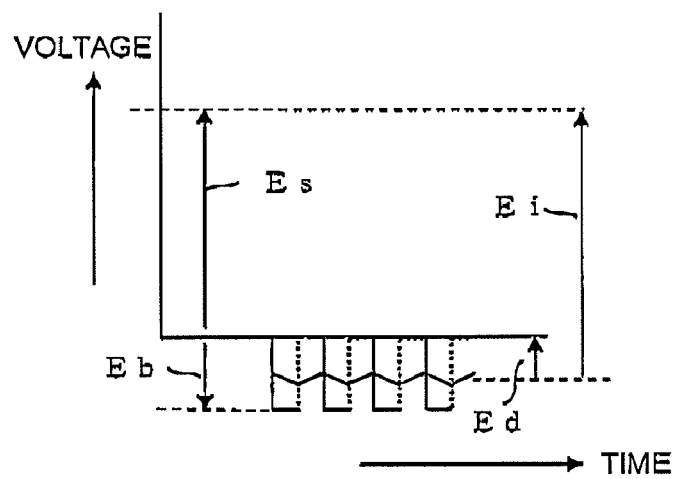
FIG. 13 is an explanatory view of the generated voltage of the power converter shown in FIG. 12.

We will now describe the operation of FIG. 11 in detail. FIG. 12 shows the operation status during power running. In FIG. 12, the switching element 22 is constantly turned off, wherein when the switching element 21 is turned on, current is flown through a path shown by the solid line via the switching element 21 and the reactor 41, and when the switching element 21 is turned off, current is flown through a path shown by the dotted line via the power storage system 11, the flywheel diode 32 and the reactor 41. Also according to the present embodiment, a chopping voltage can be obtained at point (A) as shown in FIG. 13 by turning the switching element 21 on and off.

Figure 14:
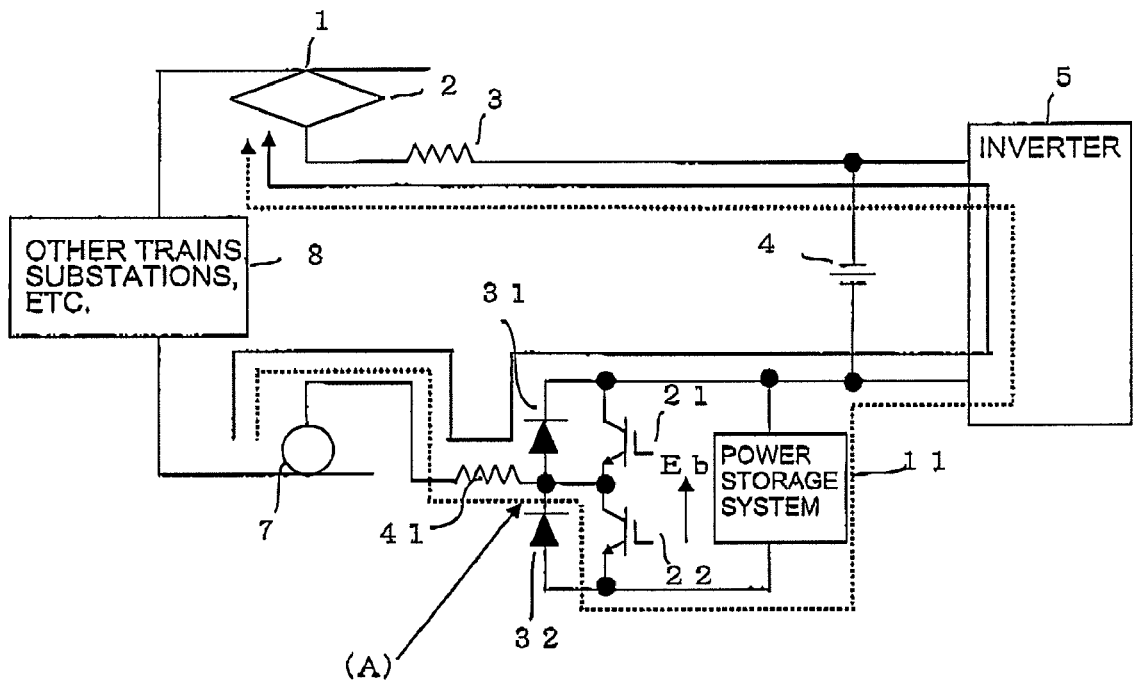
FIG. 14 is an explanatory view of the operation during regenerative braking of the power converter according embodiment 2 of the present invention shown in FIG. 11.
Figure 15:
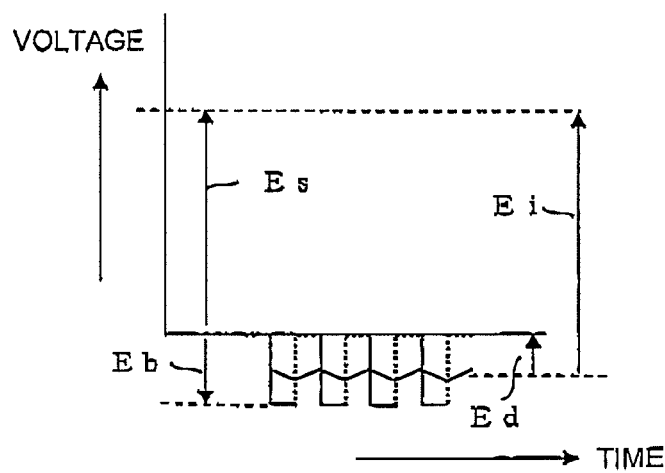
FIG. 15 is an explanatory view of the generated voltage of the power converter shown in FIG. 14.

FIG. 14 shows the operation status during braking. In this example, the switching element 21 is constantly turned off. When the switching element 22 is turned off, current is flown via a path shown by the solid line via the reactor 41 and the flywheel diode 31, and when the switching element 22 is turned on, current is flown via a path shown by the dotted line via the reactor 41, the switching element 22 and the power storage system 11. Therefore, also according to this example, a chopping voltage can be obtained at point (A) as shown in FIG. 15 by turning the switching element 22 on and off. Therefore, even according to the embodiment shown in FIG. 11, an effect similar to the embodiment shown in FIG. 6 can be obtained.

As described, the performance of the railway car can be improved by the present embodiment.

What is claimed is:

1. A control apparatus of a power conversion system for driving an induction motor via a VVVF inverter having a main circuit element, wherein
    a DC power supply source with a power storage system is inserted to a ground side of an input side of the inverter, and the output voltage of the DC power supply source is added to a trolley voltage to be applied as input voltage to the inverter.

2. The control apparatus of a power conversion system according to claim 1, wherein
    the DC power supply source with the power storage system is a step-down chopper for controlling the voltage continuously from zero and controlling the flowing current in both directions.

3. The control apparatus of a power conversion system according to claim 1, wherein
    a capacity Bb of the power storage system is a capacity equal to or smaller than the maximum energy Bbmax expressed by expression 1 in which the ratio of the trolley voltage and the power storage system voltage of the inverter is multiplied by the kinetic energy of the inverter, wherein the characteristic rotation speed of the induction motor requiring the DC power supply source output is represented by vh, the rotation speed of the induction motor not requiring the DC power supply output is represented by vl, the weight of the power conversion system is represented by M, the trolley voltage is represented by Es, and the maximum value of generated voltage of the power storage system is represented by Eb:

[expression 1]

$$Bb\max \approx \frac{1}{2}(vh^2 - vl^2) \times M \times \frac{Eb}{(Es + Eb)}. \quad (1)$$

4. The control apparatus of a power conversion system according to claim 2, wherein
the step-down chopper is composed of a power storage system capable of storing and discharging power, a switching element connected between a positive terminal and a negative terminal of the power storage system in opposed manner, a flywheel diode connected in parallel to the switching element, and a reactor connected to a neutral point between the switching element and the flywheel diode, wherein the positive terminal of the power storage system is connected to the ground side of an overhead wire.

5. The control apparatus of a power conversion system according to claim 4, wherein
DC voltage is output continuously from zero by turning one of the switching elements of the step-down chopper off and controlling an on-off conduction ratio of the other switching element according to the direction of the current flowing into or out of the inverter.

6. The control apparatus of a power conversion system according to claim 2, wherein
the step-down chopper is composed of a power storage system capable of storing and discharging power, a switching element connected between a positive terminal and a negative terminal of the power storage system in opposed manner, a flywheel diode connected in parallel to the switching element, and a reactor connected to a neutral point between the switching element and the flywheel diode, wherein the positive terminal of the power storage system is connected to a ground side of the inverter.

7. The control apparatus of a power conversion system according to claim 6, wherein
DC voltage is output continuously from zero by turning one of the switching elements of the step-down chopper off and controlling an on-off conduction ratio of the other switching element according to the direction of the current flowing into or out of the inverter.

8. A control apparatus of a power conversion system for driving an induction motor via a VVVF inverter having a main circuit element by receiving a supply of a DC power from an overhead wire, wherein
a DC power supply source having a power storage system capable of storing and discharging power is inserted to a ground-side of an input side of the inverter so that a direction of applying voltage is the same as that of the overhead wire,
the DC power supply source comprises switching elements connected between a positive terminal and a negative terminal of the power storage system in opposed manner, flywheel diodes connected in parallel to the switching elements, and a reactor connected to a neutral point between the switching elements and the flywheel diodes, wherein the positive terminal of the power storage system is connected to the ground-side of the overhead wire, the reactor is connected to the ground-side of the input side of the inverter,
an output voltage of the DC power supply source is controlled continuously from zero by turning one of the switching elements off and controlling an on-off conduction ratio of the other switching element according to the direction of the current flowing into or out of the inverter, and the flowing current is controlled in both directions, and
the output voltage of the DC power supply source is added to a trolley voltage so as to be applied as an input voltage to the inverter.

9. A control apparatus of a power conversion system according to claim 8, wherein
a capacity Bb of the power storage system satisfies a maximum energy Bbmax expressed by expression 1 in which the ratio of the trolley voltage to the inverter and an output voltage of the power storage system is multiplied by the kinetic energy of the inverter, wherein the characteristic rotation speed of the induction motor requiring the DC power supply source output is represented by vh, the rotation speed of the induction motor not requiring the DC power supply output is represented by vl, the weight of the power conversion system is represented by M, the trolley voltage is represented by Es, and the maximum value of generated voltage of the power storage system is represented by Eb:

[expression 1]

$$Bb\max \approx \frac{1}{2}(vh^2 - vl^2) \times M \times \frac{Eb}{(Es + Eb)}. \quad (1)$$

10. A control apparatus of a power conversion system for driving an induction motor via a VVVF inverter having a main circuit element by receiving a supply of a DC power from an overhead wire, wherein
a DC power supply source having a power storage system capable of storing and discharging power is inserted to a ground-side of an input side of the inverter so that a direction of applying voltage is the same as that of the overhead wire,
the DC power supply source comprises switching elements connected between a positive terminal and a negative terminal of the power storage system in opposed manner, flywheel diodes connected in parallel to the switching elements, and a reactor connected to a neutral point between the switching elements and the flywheel diodes, wherein the positive terminal of the power storage system is connected to the ground-side of the input side of the inverter and the reactor is connected to the ground-side of the overhead wire,
an output voltage of the DC power supply source is controlled continuously from zero by turning one of the switching elements off and controlling an on-off conduction ratio of the other switching element according to the direction of the current flowing into or out of the inverter, and the flowing current is controlled in both directions, and the output voltage of the DC power supply source is added to a trolley voltage so as to be applied as an input voltage to the inverter.

11. A control apparatus of a power conversion system according to claim 10, wherein a capacity Bb of the power storage system satisfies a maximum energy Bbmax expressed by expression 1 in which the ratio of the trolley voltage to the inverter and an output voltage of the power storage system is multiplied by the kinetic energy of the inverter, wherein the characteristic rotation speed of the induction motor requiring the DC power supply source output is represented by vh, the rotation speed of the induction motor not requiring the DC power supply output is represented by vl, the weight of the power conversion system is represented by M, the trolley voltage is represented by Es, and the maximum value of generated voltage of the power storage system is represented by Eb:

[expression 1]

$$Bb\max \fallingdotseq \frac{1}{2}(vh^2 - vl^2) \times M \times \frac{Eb}{(Es+Eb)}. \qquad (1)$$

* * * * *